United States Patent [19]

Brick

[11] Patent Number: 4,574,908
[45] Date of Patent: Mar. 11, 1986

[54] AUTOMATIC BRAKING SYSTEM FOR BACKING VEHICLES

[76] Inventor: Francis M. Brick, 3242 Lenape Dr., Dresher, Pa. 19025

[21] Appl. No.: 482,983

[22] Filed: Apr. 7, 1983

Related U.S. Application Data

[63] Continuation-in-part of Ser. No. 444,693, Nov. 26, 1982, abandoned.

[51] Int. Cl.⁴ .............................................. B60T 7/12
[52] U.S. Cl. .................... 180/169; 180/271; 303/2
[58] Field of Search ............... 180/167, 169, 271, 274, 180/275; 303/2, 13

[56] References Cited

U.S. PATENT DOCUMENTS

| | | | |
|---|---|---|---|
| 2,588,815 | 3/1952 | Fasolino | 180/275 |
| 3,269,783 | 8/1966 | Kriz | 180/275 X |
| 3,749,197 | 7/1973 | Deutsch | 180/169 |
| 3,890,012 | 6/1975 | O'Toole | 303/2 X |
| 3,905,441 | 9/1975 | Kawata | 180/169 |
| 3,905,651 | 9/1975 | Hornung | 303/2 |
| 4,072,360 | 2/1978 | Carroll et al. | 303/2 |
| 4,116,296 | 9/1978 | Pleier et al. | 180/273 |
| 4,403,674 | 9/1983 | Viall, Sr. et al. | 180/275 |
| 4,407,388 | 10/1983 | Steel | 180/275 X |

*Primary Examiner*—Joseph F. Peters, Jr.
*Assistant Examiner*—Michael Mar
*Attorney, Agent, or Firm*—William H. Eilberg

[57] ABSTRACT

A system is shown for automatically applying the brakes of a vehicle moving in reverse, when there is an obstruction in the path of the vehicle. Obstructions are detected by an ultrasonic sensing device which operates a valve, which causes the brakes to be applied. In one embodiment for use with hydraulic brakes, a dual accumulator utilizes both power-steering fluid and braking fluid in the operation of the system, without mixing the two fluids. In another embodiment, the system is used with a pneumatic braking system. In both embodiments, the system is activated only when the vehicle is in reverse gear. In still another embodiment, for use with hydraulic brakes, the brakes are applied solely by pressure from the power steering system of the vehicle.

6 Claims, 7 Drawing Figures

AUTOMATIC BRAKING SYSTEM FOR BACKING VEHICLES

REFERENCE TO PRIOR APPLICATION

This is a Continuation-In-Part of U.S. patent application Ser. No. 444,693, filed Nov. 26, 1982 now abandoned.

BACKGROUND OF THE INVENTION

This invention is an automatic safety device for braking a vehicle which is moving in reverse. The need for such devices has been recognized for a long time. Many solutions to the problem of ensuring safety for vehicles when traveling backward have been devised. In the 19th century, for example, a simple and effective device was developed, consisting of several large springs, suitable for use on a wagon backing up to a loading dock.

The sophistication of such devices has gradually increased. Examples of devices that have been used include systems having a mechanical arm which applies the brake of the vehicle, or actuates a warning signal. The major disadvantage of such systems is that they require physical contact between the obstruction and the mechanical sensing means before the brake is actuated.

The present invention, instead of using a mechanical arm for detecting obstacles, uses an ultrasonic device which detects such obstacles before the vehicle can collide with them.

Ultrasonic ranging devices have been known in the art for some time. They have the advantages of simplicity and effectiveness, without some of the problems of radar (which could have adverse effects on pacemakers in populated areas, for example). Ultrasonic sensing devices depend on the fact that the human ear cannot detect sound waves below 20 Hz and above 20,000 Hz. Frequencies above 20,000 Hz are designated as ultrasonic. Such high frequency vibrations are generated by quartz crystal oscillators, exhibiting the piezoelectric effect. When the crystal is subjected to compression or extension pressure, it generates a voltage. Conversely, when the crystal is subjected to an alternating voltage, it expands and contracts at the same frequency as the applied voltage. When a crystal is made to vibrate at its resonant frequency, its amplitude of vibration becomes large, and the vibrations can be used as the source of compressional waves whose frequency is well above the audible level.

In ultrasonic ranging devices, short pulses of ultrasonic energy are transmitted directionally from a ceramic speaker and are reflected back by objects encountered by the pulses in a particular direction. The reflected pulse is detected by the speaker during "listening time", i.e. the time between transmitted pulses. Because the range is very short, the pulses last a few thousandths of a second. The longer the range, the longer the pulse. In the application of the present invention, ranges of up to six feet are used.

SUMMARY OF THE INVENTION

The present invention has three embodiments, two embodiments suitable for use in a vehicle having hydraulic brakes, and the third embodiment suitable for use in a vehicle with pneumatic brakes. In the first hydraulic embodiment, the system comprises a dual pressure accumulator, which is a cylindrical body having two slidable pistons disposed therein. Fluid from the power steering system of the vehicle enters the body, and pushes against one of the pistons. This piston, in turn, compresses air in the region between the pistons. The second piston, while the system is still not actuated, is unable to respond to the pressure on it, because the second piston is positioned adjacent to a mass of braking fluid, which fills the remainder of the cylindrical body. When the ultrasonic sensing device detects an obstruction in the path of the vehicle, and the vehicle is in reverse gear, the sensing device actuates a valve which releases the braking fluid from the pressure accumulator. The compressed air within the accumulator forces the second piston to move, thereby pushing braking fluid out of the accumulator and into the vehicle brake lines. A reset switch is connected to restore the system to its original configuration.

In the second hydraulic embodiment, a signal from the sensing device actuates a valve which causes fluid from the power steering system to enter a cylinder, and to press upon a piston disposed therein. The piston, in turn, forces brake fluid into the brake line. In this embodiment, there is no storage of energy in the cylinder (as is the case with the pressure accumulator of the first embodiment). Instead, braking power is obtained, when needed, directly from the power steering system.

In the pneumatic embodiment, the system comprises an ultrasonic sensing device, a reservoir for compressed air, and a three-position valve which is operated by solenoids. When the system is in its non-actuated state, the air within the reservoir is unable to escape. When the ultrasonic sensing device detects an obstruction, it actuates the solenoid valve to provide a path from the reservoir to the air brakes. When the reset switch is depressed, the position of the valve is changed to allow air to be vented from the air brakes into the atmosphere.

In all the embodiments, the ultrasonic sensing device is connected to its power supply only when the vehicle is in reverse gear.

Accordingly, it is an object of the present invention to provide a system which causes a vehicle to stop before encountering an obstruction while traveling backwards.

It is a further object of the invention to provide protection against collisions between a vehicle and objects within a pre-set range of the vehicle, while the vehicle is in reverse gear.

It is a further object of the invention to provide an automatic braking system for a backing vehicle, which is suitable for use with hydraulic brakes.

It is a further object of the invention to provide an automatic braking system which is suitable for use with pneumatic brakes.

It is a further object of the invention to provide a dual pressure accumulator, for use in an automatic braking system, which uses pressure from the power steering system of the vehicle, without mixing power steering and braking fluid.

It is a further object of the invention to provide a single-piston hydraulic system, which uses available pressure from the power steering system to operate the brakes directly.

Other objects and advantages of the present invention will be apparent to those skilled in the art from a reading of the following brief description of the drawings, the detailed description of the invention, and the appended claims.

DETAILED DESCRIPTION OF THE INVENTION

Figure 4:
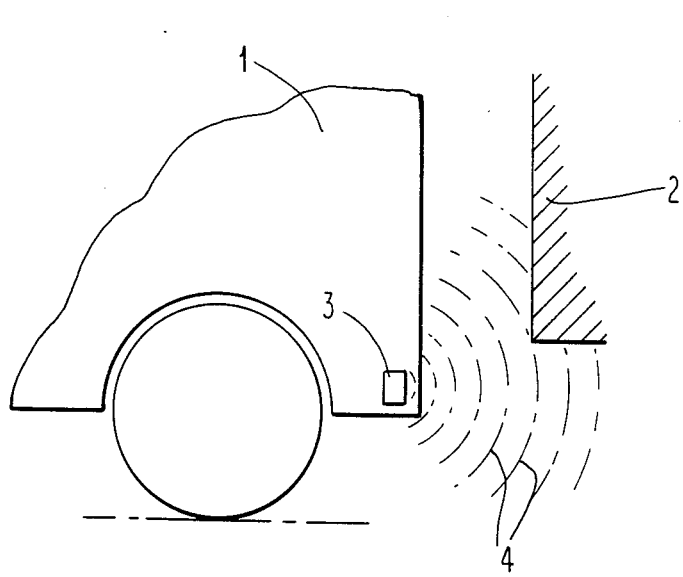
FIG. 4 is a cut-away diagram, in side elevation, illustrating the use of the present invention in a vehicle traveling in reverse, and encountering an obstruction.
Figure 5:
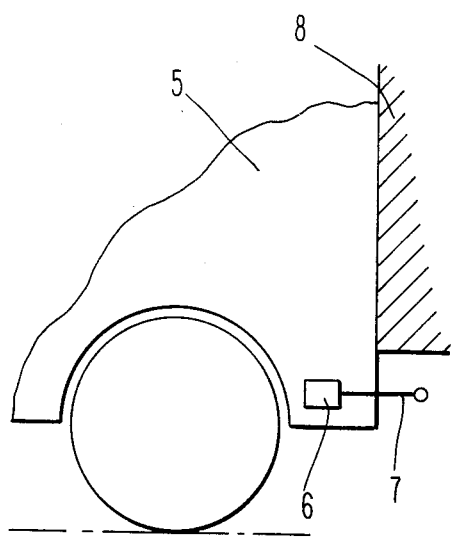
FIG. 5 is a cut-away diagram, in side elevation, showing a detecting device of the prior art, wherein the vehicle is also encountering an obstruction.

Before describing the details of the present invention, it is helpful to illustrate the advantages of the use of ultrasonic sensing devices in automatic braking systems. FIGS. 4 and 5 illustrate the advantage of the ultrasonic device. In FIG. 4, there is shown vehicle 1 approaching obstacle 2. Obstacle 2 is located above ground level; it could be the projection from a loading dock, for example. Disposed on vehicle 1 is ultrasonic sensing device 3, which is shown emitting ultrasonic waves 4. As is clear from FIG. 4, the waves 4 easily reach obstacle 2, and are reflected back to the ultrasonic sensing device 3.

The device of the prior art, shown in FIG. 5, is not as effective. In FIG. 5, there is illustrated vehicle 5, which has collided with obstacle 8. Vehicle 5 is equipped with conventional sensing device 6, having a mechanical arm 7. Because of the position of obstacle 8 above the ground level, sensing arm 7 has not been touched by obstacle 8, and the vehicle 5 has been allowed to collide with the obstacle 8, no brakes having been applied. Thus, it is clear that the use of ultrasonic devices is preferable, because all obstructions within a given range, whether at ground level or above ground level will be detected in time to prevent an accident.

Figure 1:
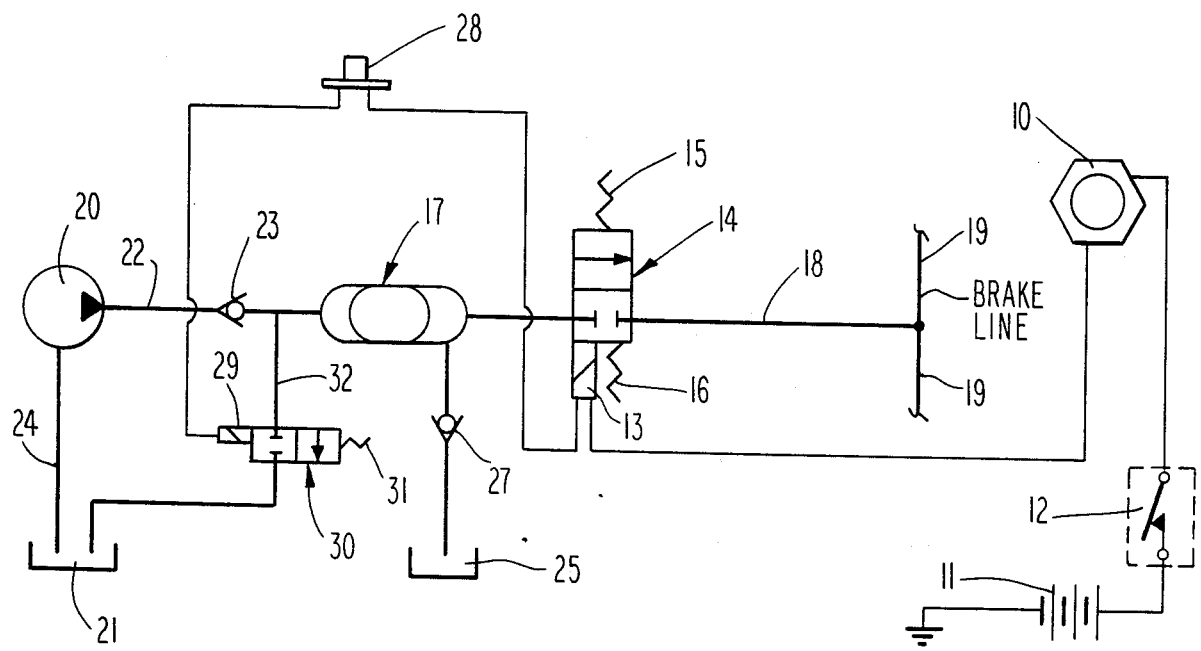
FIG. 1 is a schematic diagram of the automatic braking system, in one of the embodiments for use with hydraulic brakes.
Figure 2:
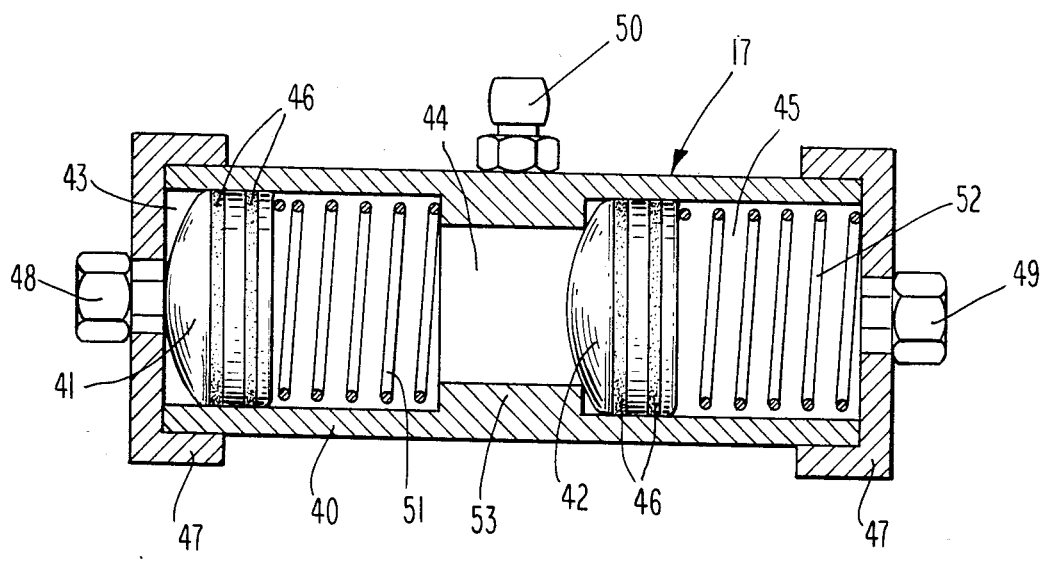
FIG. 2 is a longitudinal cross-sectional view of the dual pressure accumulator, which is used in the hydraulic embodiment of FIG. 1.

FIGS. 1 and 2 illustrate the details of one of the two embodiments of the invention suitable for use with hydraulic brakes. Ultrasonic sensing device 10 receives its power from power supply 11, through switch 12. Switch 12 can be the switch which operates the back-up light of the vehicle. Thus, the ultrasonic sensing device 10 will be operative only when the gear shift (not shown) is placed in reverse. Ultrasonic sensing device 10 is connected electrically to solenoid 13 which operates valve 14. Spring means 15 and 16 bias the valve 14 in a normally closed position. The valve 14 is connected to dual pressure accumulator 17, the structure of which will be described in more detail below. Valve 14 is a two-position valve, which, when actuated, opens a flow path 18 from accumulator 17 to brake line 19. When the valve 14 is not actuated, spring means 15 and 16 cause the valve to return to its closed position, preventing flow of braking fluid through the valve.

In FIG. 1, there is also shown power steering pump 20 which pumps power steering fluid along line 22 through check valve 23, into dual accumulator 17. Power steering pump 20 also receives fluid from reservoir 21 through line 24. Also provided is reservoir 25 for brake fluid, which may flow into accumulator 17 through line 26 having check valve 27.

FIG. 1 also shows reset button 28 which is connected both to solenoid 13 of valve 14, and to solenoid 29 of valve 30. Valve 30 also has two positions, and has a spring means 31 which keeps the valve normally closed. When valve 30 is open, power steering fluid may flow out of dual accumulator 17, through line 32 and through the valve 30 to reservoir 21.

The detailed structure of dual accumulator 17 is illustrated in the cross-sectional view of FIG. 2. Accumulator 17 comprises a body 40, of generally cylindrical shape. Disposed within the body 40 are pistons 41 and 42. The pistons 41 and 42 define three regions within the body of the cylinder. The first region, indicated by reference numeral 43, is intended to receive power steering fluid from the power steering pump. The second region, designated by reference numeral 44, is designed to contain a quantity of compressed air. The third region, designated by reference numeral 45, is designed to hold braking fluid, which could be air or preferably a liquid. Pistons 41 and 42 are provided with O ring seals 46.

Mounted on cylindrical body 40 are end caps 47. Mounted on the end caps are fittings 48 and 49 which provide connections to the power steering pump and brake line respectively. The accumulator 17 is also provided with air chuck 50 which is used to pressurize the air chamber, defined by region 44.

The accumulator 17 is also provided with spring means 51 and 52, which bias the pistons in the absence of other forces. The interior of cylindrical body 40 is provided with annular protrusion 53 which limits the motion of the pistons.

The operation of the hydraulic embodiment described above will now be explained. When the engine of the vehicle is started, the power steering pump 20 begins to operate. The pump 20 causes pressure to build in the dual accumulator 17, as power steering fluid flows through line 22, and check valve 23, into region 43 of the accumulator 17. Due to the operation of the check valve 23, and the closed position of solenoid valve 30, the pressure of the power steering fluid in region 43 of the accumulator does not decrease. Meanwhile, air that has been pre-pressurized to 100 p.s.i. is introduced into region 44 of accumulator 17, through air chuck 50. As the power steering pump 20 continues to operate, the piston 41 is moved against spring means 51, and compresses the air in region 44. The air pressure builds up to about 800 p.s.i. Because region 45 has been previously filled with brake fluid and because solenoid valve 14 is closed, piston 42 cannot move in response to the increase of air pressure in region 44.

When the gear shift of the vehicle is placed in reverse, the back-up light switch 12 provides power to the ultrasonic sensing device 10. When the ultrasonic sensing device 10 detects an object in its range, it actuates solenoid valve 14, which opens a path from accumulator 17 to brake line 19. That is, the opening of the line 18 allows the compressed air in region 44 of the accumulator 17 to push piston 42 towards the end of the accumulator, forcing brake fluid out. Thus, the brakes of the vehicle are automatically applied. Note that throughout the operation, the power of the power steering pump is used without intermixing the brake fluid and the power steering fluid.

To restore the vehicle to normal operation, reset button 28 is pushed. Button 28 energizes both solenoid valves 14 and 30. By energizing solenoid valve 30, a path for the power steering fluid is provided from region 43 through valve 30, to reservoir 21. Because of check valve 23, this is the only path that the power steering fluid can take. Thus, spring means 51 pushes piston 41 towards the left, as shown in FIG. 2, and the air pressure in region 44 decreases. This decrease in pressure allows spring means 52 to push piston 42 in the same direction of motion as that of piston 41. Because reset button 28 has also maintained valve 14 in its open position, there is still a flow path between the accumulator and the brake line. Thus, brake fluid is pulled back into region 45 of accumulator 17. Normally, there should be no loss of brake fluid, since the entire braking system is closed. However, if there should be leakage of braking fluid, the motion of piston 42 will create a partial vacuum which will draw additional braking fluid from reservoir 25, through line 26, and through check valve 27, into region 45 of the accumulator 17. The system returns to its initial state in about 2–3 seconds.

If, after actuating reset button 28, the obstruction remains, and the vehicle remains in reverse gear, the brakes will be applied again automatically when the reset button 28 is released. To prevent this occurrence, the obstruction can be removed, or the vehicle gear selector lever can be taken out of reverse gear.

The accumulator 17 thus acts as an interface to allow the use of the power steering pump as a source of actuating power for the vehicle braking system, while preventing intermixing, or contamination of brake fluid.

Figure 3:
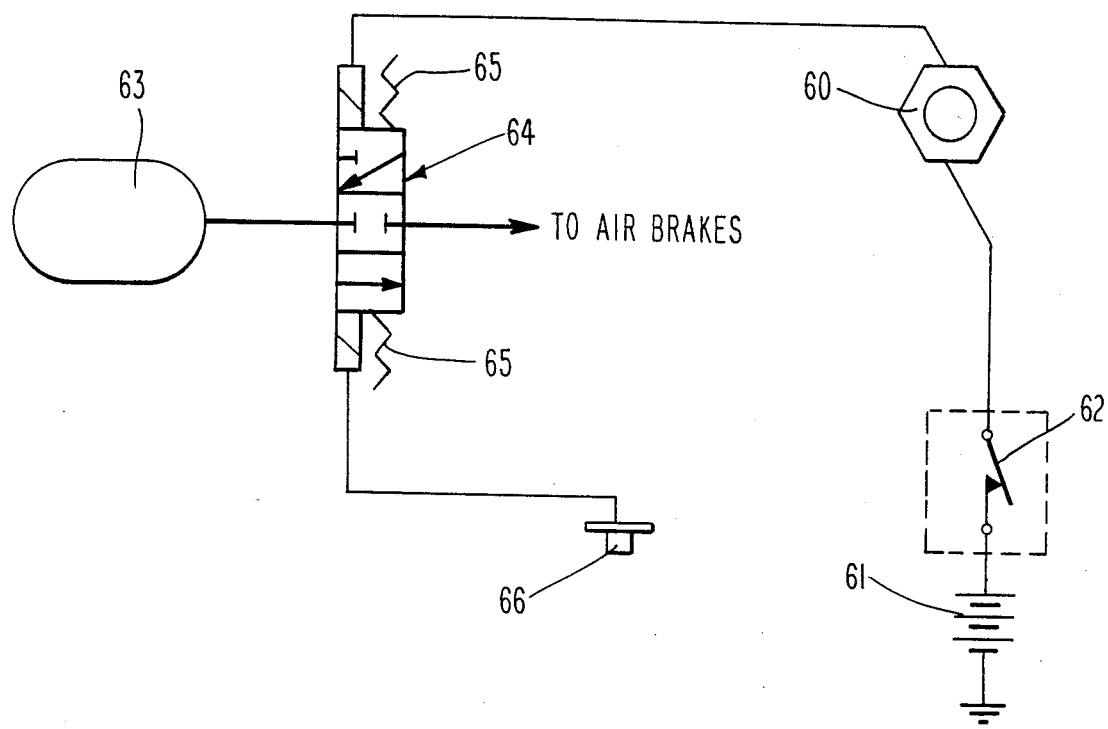
FIG. 3 is a schematic diagram of the embodiment of the invention which is suitable for use on vehicles having pneumatic brakes.

FIG. 3 shows the embodiment of the present invention which is suitable for use on vehicles having pneumatic brakes. As shown in FIG. 3, ultrasonic sensing means 60 is again connected to power supply 61 through switch 62, which may be the switch operating the back-up light of the vehicle. Air reservoir 63 provides a source of compressed air (compressing means are not shown in the figure). Solenoid valve 64 is connected to reservoir 63 and ultrasonic sensing means 60. Valve 64 has three positions. In its first position, it provides a clear path for air to flow from reservoir 63 to the air brakes of the vehicle. In its second position, the "normal" position, which is shown in FIG. 3, the valve 64 prevents air from escaping from the reservoir. In its third position, the valve allows air to escape from the air brakes, and to vent into the atmosphere.

When ultrasonic sensing means 60 emits a signal, the valve 64 is placed in its first position, and air from the reservoir 63 is allowed to flow to the air brakes, causing the vehicle to stop. When the reset button 66 is actuated, the valve 64 is placed in its third position, which allows the air to be vented into the atmosphere, and the brakes thereby released. When there is neither a signal from the ultrasonic sensing means 60 nor a signal from reset button 66, the valve 64 is biased by springs 65 to stay in its second position, i.e. the position whereby air cannot escape from reservoir 63. During this time, compressed air would be pumped into the reservoir by suitable means (not shown) to replace the air which was expended in braking the vehicle.

As in the case of the hydraulic embodiment described earlier, the brakes of the vehicle will be applied again if the obstruction is not removed and the gear shift lever remains in reverse gear. Removal of the obstruction or taking the gear shift out of reverse gear will prevent this occurrence.

Figure 6:
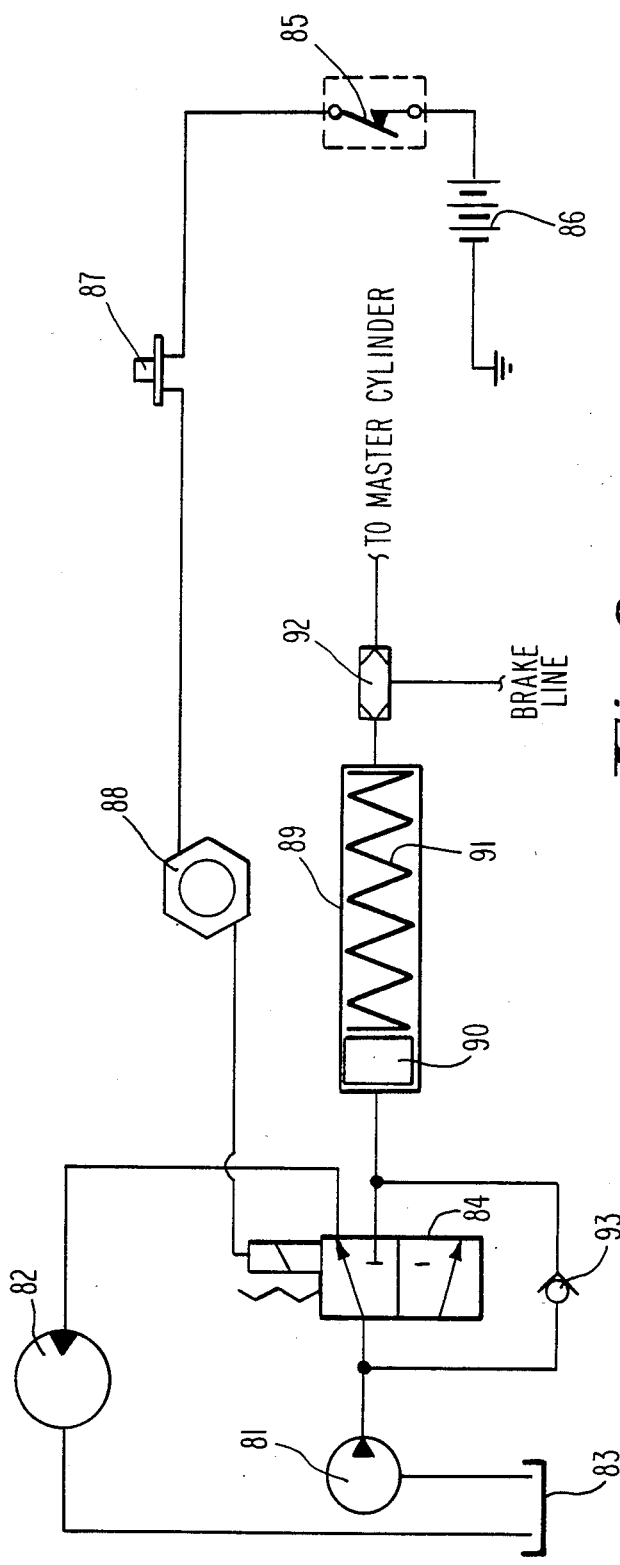
FIG. 6 is a schematic diagram of the other embodiment of the invention, which embodiment is for use with hydraulic brakes.

FIG. 6 illustrates another embodiment of the invention which is suitable for use with a hydraulic braking system. In this embodiment, a cylinder having only one piston is used. In the quiescent state, fluid from power steering fluid reservoir 83 is forced by power steering pump 81 through normally open solenoid valve 84 and through the power steering system 82, returning to reservoir 83. At the same time, brake fluid substantially fills the interior of cylinder 89, surrounding the coils of return spring 91. When the gear selector lever of the vehicle is placed in the reverse gear position, switch 85 is closed, supplying power to the ultrasonic sensing means 88. When the sensing means 88 detects an obstruction within its pre-set range, it emits a signal which switches solenoid valve 84 to the closed position, diverting all of the power steering fluid from pump 81 into cylinder 89. Piston 90, disposed within cylinder 89, is driven forward, by the power steering fluid, compressing the return spring 91, and forcing the brake fluid from the cylinder 89, through isolating valve 92, and into the brake line of the vehicle, thereby applying the brakes.

In order to release the brakes of the vehicle, the normally closed push button switch 87 is depressed to open the circuit, thereby removing power from sensing means 88, and causing the spring-biased solenoid valve 84 to return to its normally open position. Without the pressure from the power steering pump 81, spring 91 in cylinder 89 causes the piston 90 to move back to its original position. The same result can be accomplished by taking the gear selecter of the vehicle out of the reverse position, thereby opening switch 85. As the piston 90 returns to its original position, the power steering fluid, which had been forced into cylinder 89, returns to reservoir 83 through check valve 93. When the brake fluid returns to the cylinder 89, the brakes are thereby released.

Figure 7:
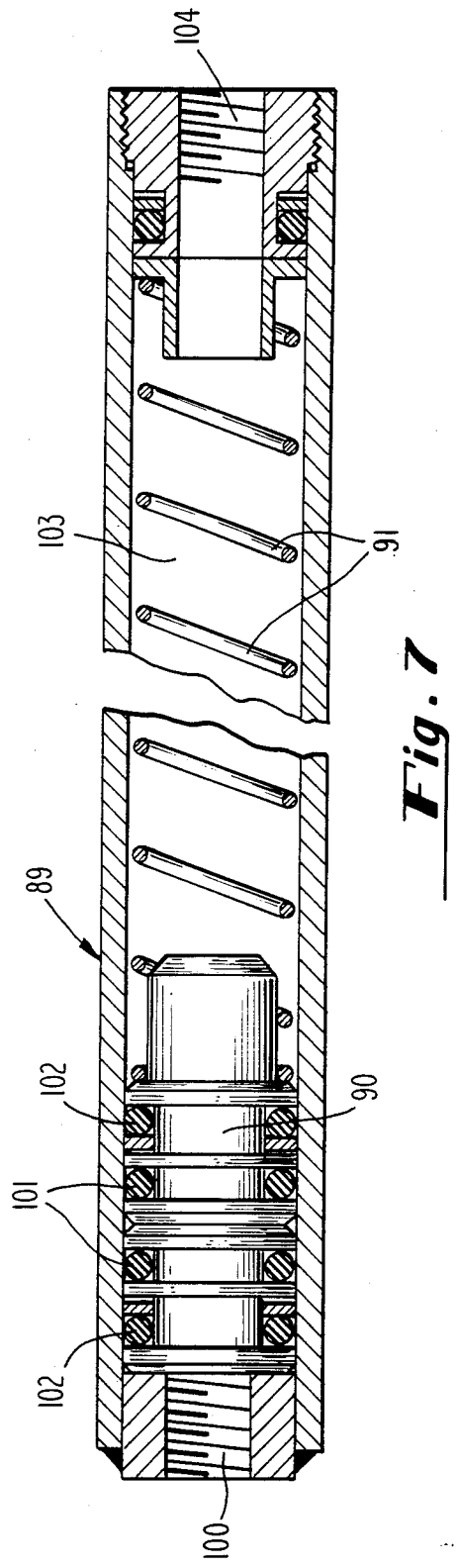
FIG. 7 is a longitudinal cross-sectional view of the cylinder used in the embodiment of FIG. 6.

FIG. 7 is a longitudinal cross-sectional view showing the structure of cylinder 89 of FIG. 6. Cylinder 89 has an inlet port 100 for the power steering fluid. The piston 90 has both wipers 101 and seals 102 to isolate the power steering and braking fluids. Spring 91 is shown, and is compressed as the piston 90 is moved by the incoming power steering fluid, forcing the braking fluid, which is contained within region 103 of the cylinder 89, out through the outlet port 104 until the brakes are fully applied.

Thus, in this second hydraulic embodiment, a dual pressure accumulator is not used; instead, a cylinder having a single piston is present. In the second hydraulic embodiment, energy is not stored in the cylinder. Instead, hydraulic pressure from the power steering system is diverted to the cylinder only when needed for braking. In the hydraulic embodiment described above, pressure was stored in the pressure accumulator, by virtue of the compressed air in region 44.

In the present invention, the system is designed so that the vehicle will stop about 1.5–2 feet from the obstruction. Clearly, the greater the speed of the vehicle, the greater the required range of the sensing means. It has been found that for vehicles traveling in reverse at about 3–4 miles per hour, the sensing means should be set to detect obstructions at a range of about 4.5 feet. The maximum practical range, at present, for the sensing means is about 6 feet.

While the invention has been described as having an ultrasonic sensing device, it is also possible to use other means, such as infrared detection. An infrared detector would be expected to reduce the overall cost of the system. What is important, however, is that the sensing means be of the non-contacting type, i.e. one which uses wave reflection (as shown in FIG. 4), rather than one using a contact means (as shown in FIG. 5). Both ultrasonic and infrared sensing means are of the non-contacting type.

It is apparent that the objects of the invention are fully achieved by the invention disclosed herein. Many modifications of the disclosed invention are possible. As stated earlier, different types of fluids may be used in the accumulator. The type of sensing means may be varied, as stated above. Variations in the dimensions of the components may be made without altering the basic features of the invention. It is understood that such modifications, which would be apparent to persons skilled in the art, are deemed within the spirit and scope of the following claims.

What is claimed is:

1. An automatic braking system for a backing vehicle, the vehicle having a hydraulically-operated braking apparatus and a hydraulically-operated power steering mechanism including a power steering pump and power steering fluid reservoir, comprising:
   (a) ultrasonic sensing means for sensing the presence of an obstruction behind the vehicle,
   (b) electrically-operated valve means connected to the sensing means, the valve means being spring-biased to assume a first position, while no signal is being received from the sensing means, the valve means in its first position providing a substantially unobstructed path for flow of power steering fluid from the reservoir, through the power steering mechanism and back to the reservoir, the valve means being capable of assuming a second position when a signal is received from the sensing means, the valve means in its second position being connected to divert the power steering fluid from the reservoir into the first end of a cylinder,
   (c) the cylinder having a piston and a spring disposed within the cylinder, the second end of the cylinder being connected to the braking apparatus of the vehicle, the piston comprising means for dividing the interior of the cylinder into first and second regions, for containing the power steering fluid and the braking fluid respectively, wherein the fluids are kept separated from each other, wherein the spring causes the piston to move towards the first end of the cylinder when the valve means is in its first position, and wherein the piston is moved towards the second end of the cylinder when the valve means is in its second position for actuating the braking apparatus of the vehicle.

2. The system of claim 1, wherein the valve means diverts substantially all of the stream of power steering fluid into the cylinder.

3. The system of claim 2, further comprising means for actuating the sensing means only when the vehicle is placed in reverse gear.

4. The system of claim 3, further comprising switch means for releasing the brakes of the vehicle after the vehicle has been stopped in response to a signal from the sensing means, the switch means comprising means for interrupting power to the valve means.

5. The system of claim 4, further comprising check valve means for providing a path for flow of power steering fluid from the cylinder back to the power steering fluid reservoir when the system is deactivated.

6. The system of claim 5, the cylinder including means for sealing the connection between the piston and the interior wall of the cylinder.

* * * * *